(12) United States Patent
Trubnikov

(10) Patent No.: US 7,966,993 B2
(45) Date of Patent: Jun. 28, 2011

(54) FUEL INJECTION PUMP HAVING A BARREL EXPANSION CONTROL SLEEVE

(75) Inventor: Timur Trubnikov, Peoria, IL (US)

(73) Assignee: Caterpillar Inc., Peoria, IL (US)

( * ) Notice: Subject to any disclaimer, the term of this patent is extended or adjusted under 35 U.S.C. 154(b) by 0 days.

(21) Appl. No.: 12/285,147

(22) Filed: Sep. 30, 2008

(65) Prior Publication Data

US 2010/0078500 A1   Apr. 1, 2010

(51) Int. Cl.
*F04B 43/08* (2006.01)
*F04B 45/06* (2006.01)

(52) U.S. Cl. .......... 123/446; 29/446; 92/169.2; 417/474

(58) Field of Classification Search .................. 123/446; 29/446; 92/169.1–169.4; 417/228, 470, 417/471, 474, 477
See application file for complete search history.

(56) References Cited

U.S. PATENT DOCUMENTS

| | | | |
|---|---|---|---|
| 1,078,444 A | 11/1913 | Kilburn | |
| 2,338,686 A | 1/1944 | Gredell | |
| 2,583,974 A * | 1/1952 | Summers | ..................... 92/169.1 |
| 2,640,434 A | 6/1953 | Leman | |
| 2,701,743 A | 2/1955 | Mattingly et al. | |
| 2,856,249 A | 10/1958 | Leman | |
| 3,880,055 A * | 4/1975 | Nakamura et al. | ........... 92/170.1 |
| 3,882,842 A | 5/1975 | Bailey et al. | |
| 4,141,329 A | 2/1979 | Pompei | |
| 4,285,642 A | 8/1981 | Komhyr | |
| 4,640,240 A * | 2/1987 | Ziegler et al. | .............. 123/193.2 |
| 4,642,103 A | 2/1987 | Gettig | |
| 5,443,209 A | 8/1995 | VanAllsburg | |
| 5,503,128 A | 4/1996 | Hickey et al. | |
| 5,894,991 A | 4/1999 | Edwards et al. | |
| 5,921,760 A * | 7/1999 | Isozumi et al. | ............... 417/470 |
| 6,105,451 A | 8/2000 | Fleissner | |
| 6,148,785 A | 11/2000 | Rivers et al. | |
| 6,193,481 B1 | 2/2001 | Alaze et al. | |
| 6,951,206 B2 * | 10/2005 | Kishimoto | .................... 123/497 |
| 7,249,939 B2 * | 7/2007 | Yanagihara et al. | .......... 417/420 |
| 2006/0123616 A1 * | 6/2006 | Aday et al. | ....................... 29/446 |
| 2006/0228239 A1 * | 10/2006 | Usui et al. | ..................... 417/470 |
| 2008/0080994 A1 * | 4/2008 | Gambier et al. | ............. 417/534 |
| 2008/0298991 A1 * | 12/2008 | Trubnikov | .................... 417/521 |

* cited by examiner

*Primary Examiner* — Stephen K Cronin
*Assistant Examiner* — David Hamaoui
(74) *Attorney, Agent, or Firm* — Miller, Matthias & Hull

(57) ABSTRACT

A fuel injection pump is provided. The fuel injection pump includes a barrel including an inner surface defining a bore. The fuel injection pump also includes a plunger movable inside the bore of the barrel. An outer surface of the plunger and the inner surface of the barrel form a clearance therebetween. One or more sleeves at least partially encircle one or more portions of an outer surface of the barrel, and are configured to apply a load to the outer surface of the barrel.

10 Claims, 3 Drawing Sheets

FUEL INJECTION PUMP HAVING A BARREL EXPANSION CONTROL SLEEVE

TECHNICAL FIELD

The present disclosure relates generally to a fuel injection pump and, more particularly, to a fuel injection pump having a barrel expansion control sleeve.

BACKGROUND

Fuel injection pumps are commonly used in modern engines, such as gasoline engines and diesel engines, to deliver pressurized fuel into engine combustion chambers for combustion. For example, in some diesel engine applications, the pressure provided by the fuel injection pump can be on the order of $10^4$ psi or higher. A typical fuel injection pump may include a cylindrical body having a barrel with a central bore therein and a plunger reciprocating within the bore of the barrel. Due to the need for similar thermal mass for the plunger and the barrel in order to maintain uniform clearance between the plunger and the barrel, the pump barrel is sometimes designed to have thin walls. This may result in a reduced radial stiffness of the barrel. Thus, when the pressure within the bore of the barrel is high, the barrel may undergo radial expansion under the high pressure, and the clearance between the plunger and the barrel may be increased. The increased clearance may cause leakage of fuel and may reduce the volumetric pumping efficiency.

A high pressure fuel injector for a diesel engine is described in U.S. Pat. No. 5,443,209 (the '209 patent) issued to VanAllsburg on Aug. 22, 1995. The fuel injector includes an injector body and a plunger located within a bore of the body, which also defines a pump chamber. When the plunger moves to pressurize the fuel in the pump chamber, the plunger is subject to a high compressive force due to the high pressure fuel. According to the '209 patent, the high compressive force would cause a conventional plunger to expand, and would result in radial expansion of the plunger, causing a reduction in the clearance between the plunger and the inner surface of the injector body. To reduce the radial expansion of the plunger and maintain uniform clearance, the '209 patent discloses a two-piece plunger design. A cylindrical piston is counterbored along its longitudinal axis to a certain depth, and a push rod is located within the counterbored piston. When the plunger is subject to the high compressive force within the pumping chamber, the push rod is allowed to expand radially. Because the radial expansion of the push rod does not affect the outer diameter of the piston, it does not affect the clearance between the plunger and the inner surface of the injector body.

Although the fuel injector of the '209 patent may control the radial expansion of the plunger in order to maintain uniform clearance, it may still be problematic in some applications. For example, the clearance may also be increased due to the expansion of the injector body under high pressure. When the injector body includes thin walls, the high pressure within the pump chamber may cause the thin walls to expand radially. The radial expansion of the thin walls may result in an increase in the clearance between the plunger and the thin walls, which may cause fuel leakage and may reduce the volumetric pumping efficiency of the fuel injector.

The present disclosure is directed toward improvements in the existing technology.

SUMMARY

In one aspect, the present disclosure is directed to a fuel injection pump. The fuel injection pump includes a barrel including an inner surface defining a bore. The fuel injection pump also includes a plunger movable inside the bore of the barrel. An outer surface of the plunger and the inner surface of the barrel form a clearance therebetween. One or more sleeves at least partially encircle one or more portions of an outer surface of the barrel and are configured to apply a load to the outer surface of the barrel.

In another aspect, the present disclosure is directed to a method of maintaining a clearance formed between an outer surface of a plunger and an inner surface of a barrel of a fuel injection pump. The method includes pumping fuel from a reservoir to the fuel injection pump. The method also includes applying a load to an outer surface of the barrel by one or more sleeves at least partially encircling one or more portions of the outer surface of the barrel.

DETAILED DESCRIPTION

Figure 1:
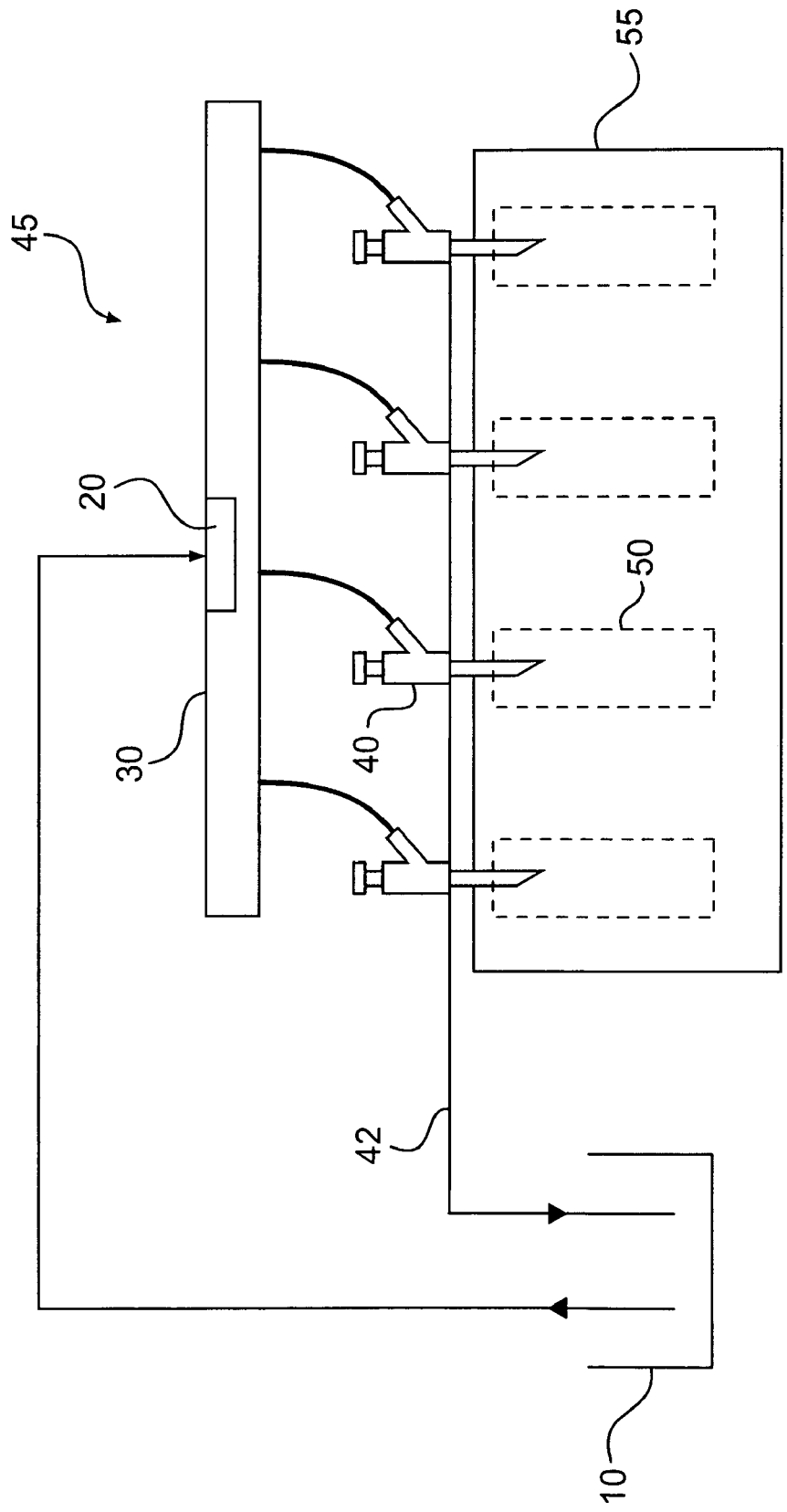
FIG. 1 is a schematic illustration of an exemplary fuel system in which the disclosed fuel injection pump may be employed.

FIG. 1 is a schematic illustration of an exemplary fuel system 45 in which the disclosed fuel injection pump having a barrel expansion control sleeve may be employed. The fuel system 45 may be employed in a power system (not shown) that generates power from combusting fuel. The power system may include a combustion engine 55, which may be an internal combustion engine, such as a diesel or gasoline engine. The combustion engine 55 may include at least one combustion chamber 50. For example, FIG. 1 illustrates a combustion engine 55 with four combustion chambers 50. The fuel system 45 may be associated with the combustion chambers 50 and may deliver fuel from a fuel source to each of the combustion chambers 50.

The fuel system 45 may include a fuel reservoir 10 for storing fuel to be supplied to the combustion engine 55. The fuel system 45 also may include a plurality of fuel injectors 40. Each of the fuel injectors 40 may be disposed adjacent a combustion chamber 50, and may inject fuel into the combustion chamber 50. Each of the fuel injectors 40 may be connected with an upstream common rail 30, which may distribute fuel to the fuel injectors 40. The fuel injectors 40 may also be connected with a fuel return line 42. Fuel return line 42 may redirect surplus fuel from the fuel injectors 40 back to the fuel reservoir 10. At least one fuel injection pump 20 may be associated with the common rail 30, and may pump fuel from the fuel reservoir 10, pressurize the fuel to a suitably high pressure, and deliver the fuel to the common rail 30.

Figure 2:
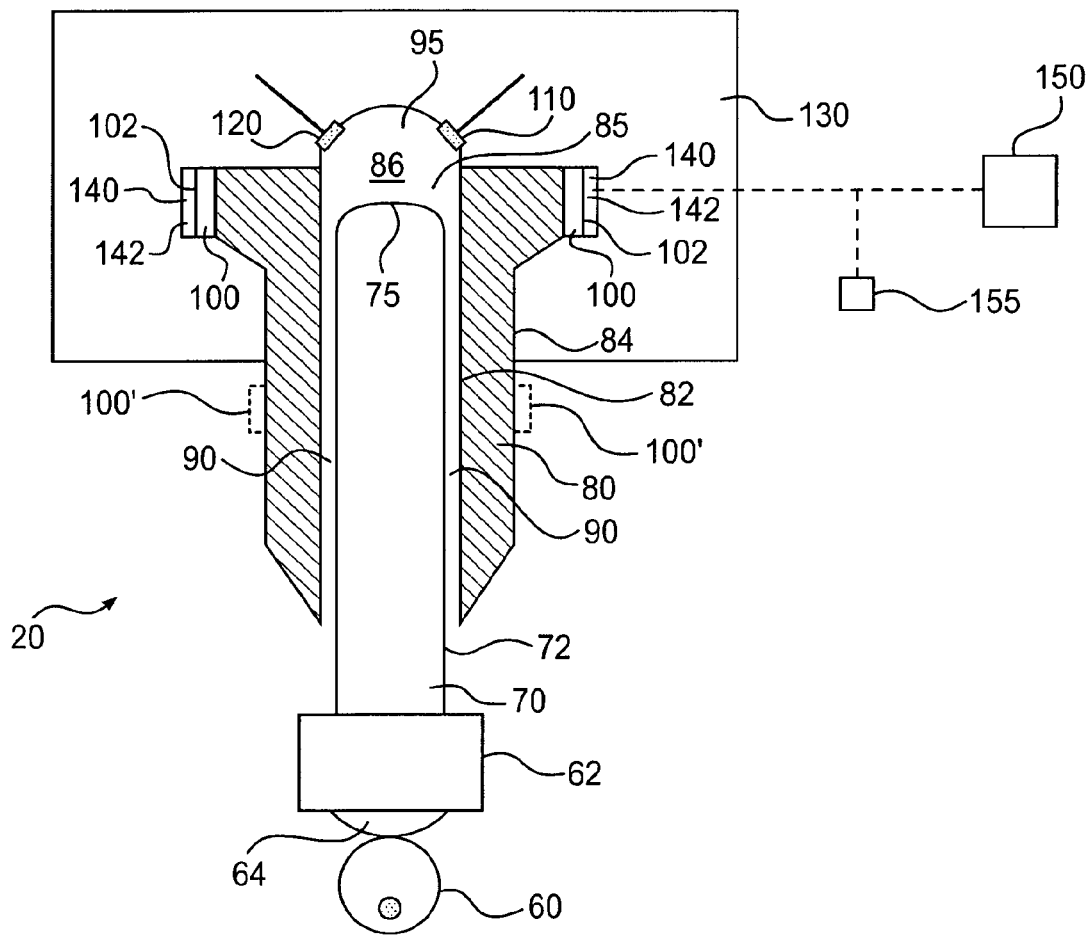
FIG. 2 is a schematic illustration of an exemplary disclosed fuel injection pump.

FIG. 2 schematically illustrates an exemplary disclosed fuel injection pump 20. The fuel injection pump 20 may be partially embedded in a common rail body 130, which is part of the common rail 30. The fuel injection pump 20 may also be a separate structure with respect to the common rail body 130 and include multiple pumping chambers. The fuel injection pump 20 may include a barrel 80. The barrel 80 may have a longitudinally extended cylindrical body. The barrel 80 may include a cylindrical inner surface 82, which may define a cylindrical bore 85 within the barrel 80. The barrel 80 may also include an outer surface 84. The thickness of the barrel 80 between the inner surface 82 and the outer surface 84 may be uniform or may vary in the longitudinal direction.

The fuel injection pump 20 may include a plunger 70 movable within the bore 85 of the barrel 80. The plunger 70 may have a cylindrical body with an outer surface 72. The outer surface 72 of the plunger 70 and the inner surface 82 of the barrel 80 may define a clearance 90. It is typically desirable to maintain the clearance 90 uniform along the longitudinal direction of the bore 85. The space between an end 75 of the plunger 70 and an end 95 of the bore 85 may define a pumping chamber 86. The plunger 70 may include a plunger head 62, which may have a larger outer diameter than the remaining body of the plunger 70. The plunger head 62 may be driven by a cam 60 or any suitable mechanisms. The cam 60 may be in contact with a portion 64 of the plunger head 62. Through the cam 60, the plunger 70 may be driven to reciprocate within the bore 85.

Adjacent the pumping chamber 86 at the end 95 of the bore 85, the fuel system 45 may include a fuel intake valve 110 and a fuel discharge valve 120. The fuel intake valve 110 may open to allow fuel to be directed into the pumping chamber 86 during a fuel intake process, when the fuel discharge valve 120 may be closed. During a fuel pumping process, the fuel intake valve 110 may be closed. As the plunger 70 moves closer to the end 95 of the bore 85 to reduce the volume of the pumping chamber 86 and pressurize the fuel, the fuel discharge valve 120 may open at a predetermined time to discharge the high-pressure fuel from the pumping chamber 86 to the common rail 30. The discharged high-pressure fuel may be further distributed by the common rail 30 to the fuel injectors 40, and may be subsequently injected by the fuel injectors 40 into the at least one combustion chamber 50.

As shown in FIG. 2, the fuel injection pump 20 may include a ring-type sleeve 100 at least partially encircling a portion of the outer surface 84 adjacent the end 95 of the bore 85 proximate the fuel discharge valve 120. In some embodiments, in addition to the sleeve 100 (a first sleeve), the fuel injection pump 20 may also include a second sleeve 100' at least partially encircling a portion of the outer surface 84 of the barrel 80 spaced apart from the end 95 of the bore 85 proximate the fuel discharge valve 120. It is contemplated that a plurality of sleeves may be employed with the barrel 80, each encircling a different portion of the outer surface 84. Where a plurality of sleeves are employed, the sleeves may be similar or different in terms of material properties. For example, the second sleeve 100' may have the same Young's modulus and thermal expansion coefficient as the first sleeve 100. Alternatively, the material properties of the first sleeve 100 may be different from the material properties of the second sleeve 100'.

In FIG. 2, the first sleeve 100 is shown to at least partially encircle a portion of the outer surface 84 adjacent the end 95, where the fuel discharge valve 120 may be located. The portion of the barrel 80 adjacent the end 95 may experience very high pressure during a fuel pumping process, which may cause the barrel 80 to expand radially. The second sleeve 100' may at least partially encircle a portion of the outer surface 84, e.g., a portion at the middle section of the barrel 80, or any suitable portion of the outer surface 84. The first and second sleeves 100 and 100' may help reduce the radial expansion of the barrel 80 and maintain uniform clearance between the plunger 70 and the barrel 80.

Also as shown in FIG. 2, a space or chamber 140 may be provided between the first sleeve 100 and the common rail body 130. The chamber 140 may be configured to accommodate a cooling fluid 142, which may reduce the temperature of the first sleeve 100. When the temperature of the first sleeve 100 is reduced, the thermal expansion of the first sleeve 100 may be affected. The temperature of the cooling fluid 142 may be measured by a temperature sensor 155 disposed at an appropriate location. The sensor 155 may generate a signal indicative of the measured temperature of the cooling fluid 142 and may send the signal to a controller 150 coupled with the sensor 155. The controller 150 may be configured to receive the signal sent by the sensor 155, and may regulate the temperature of the cooling fluid 142 based on the measured temperature and a desired cooling effect. The desired cooling effect may be associated with a desired uniform clearance between the plunger 70 and the barrel 80, for example, through a map (not shown) in the controller 150. It is contemplated that the controller 150 may be further associated with other devices (not shown) to regulate the temperature of the cooling fluid 142. The thermal expansion of the first sleeve 100 may be controlled by the controller 150 by regulating the temperature of the cooling fluid 142. Although not shown, a space or chamber configured to contain a cooling fluid may also be provided to surround the second sleeve 100' to further control the thermal expansion of the second sleeve 100' and the corresponding portion of the barrel 80 that the second sleeve 100' at least partially encircles.

INDUSTRIAL APPLICABILITY

Figure 3A:
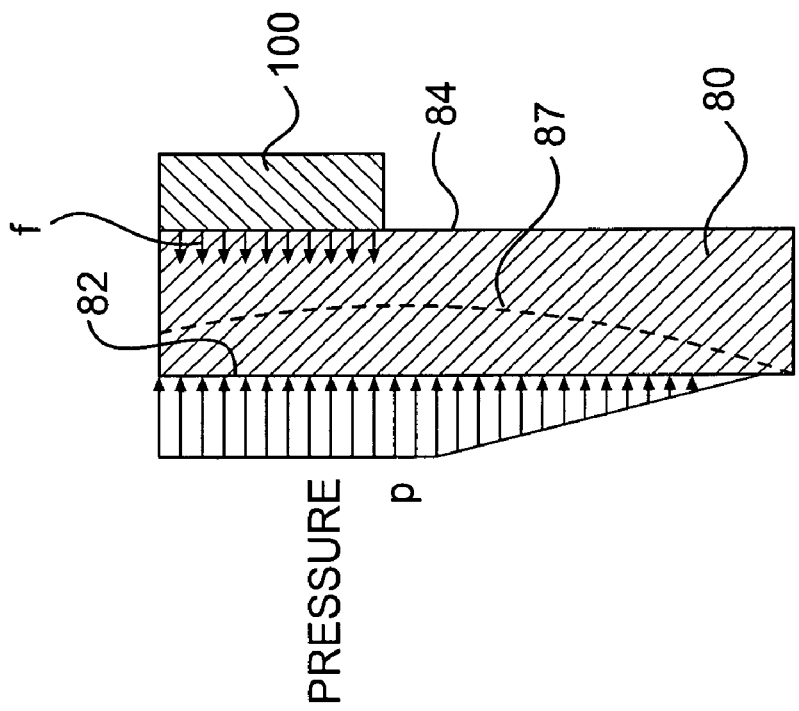
FIG. 3A is a schematic illustration of radial expansion of the barrel under high pressure without sleeves being applied to the barrel.
Figure 3B:
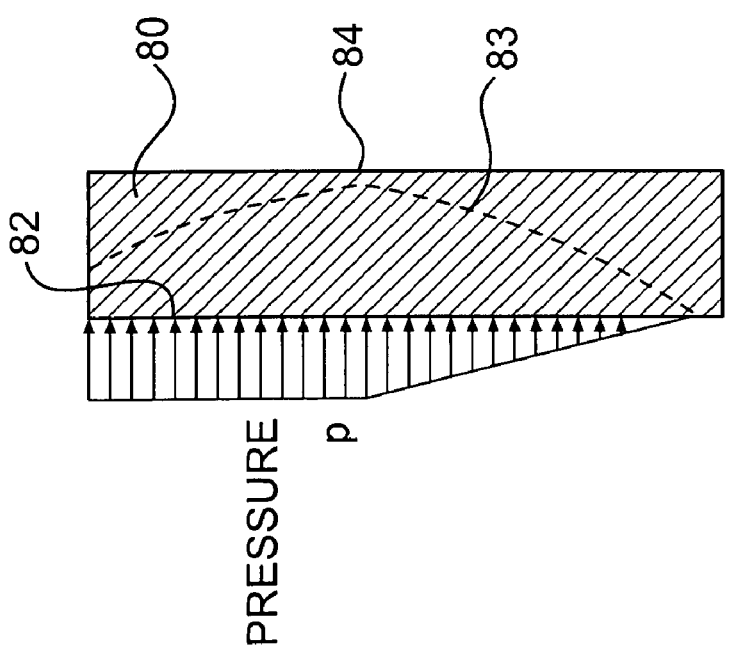
FIG. 3B is a schematic illustration of radial expansion of the barrel under high pressure with sleeves being applied to the barrel.

FIGS. 3A and 3B illustrate how the first and second sleeves 100 and/or 100' may help improve the uniformity of clearance 90. Shown in FIG. 3A is a portion of the barrel 80 with the inner surface 82 and the outer surface 84. During a pumping process, the inner surface 82 may be subject to a high pressure p applied by the high pressure fuel within the pumping chamber 86. The pressure p may be uniformly or variably distributed on the inner surface 82 along the longitudinal direction of the bore 85. FIG. 3A illustrates one example of a possible profile of the distribution of the pressure p. Due to the high pressure p, the barrel 80 may undergo a radial expansion, and the inner surface 82 may be deformed outwardly. The deformed inner surface may be referred to as a first deformed inner surface 83, as shown in dotted line in FIG. 3A. It is noted that the outward deformation of the inner surface 82 in FIG. 3A is exaggerated for illustration purposes.

In FIG. 3B, the first sleeve 100 is applied to a portion of the outer surface 84 of the barrel 80. With proper selection of Young's modulus, thermal expansion coefficient, and proper control of the cooling fluid 142, the first sleeve 100 may exert a compressive load f on the outer surface 84. Since the direction of the compressive load f (inward) is opposite to the direction of the pressure p (outward), the compressive load f may cancel out some effects of the pressure p, thereby reducing the radial expansion of the bore 85, or the outward deformation of the inner surface 82. The deformed inner surface in this case may be referred to as a second deformed inner surface 87, which indicates a smaller outward deformation as compared to the first deformed inner surface 83 shown in FIG. 3A.

To achieve the effect of reducing the radial expansion of the barrel 80, the first sleeve 100 may be made of an elastic material (such as a metallic alloy or a composite material) with a Young's modulus larger than that of the material (typically steel) used to make the barrel 80. In other words, the first sleeve 100 may be made stiffer than the barrel 80. With the first sleeve 100, the barrel 80 may undergo less expansion under the same high pressure p during a pumping process. Thus the first sleeve 100 may stiffen the barrel 80 against the high pressure within the pumping chamber 86. In addition, the first sleeve 100 may have an inner diameter smaller than an outer diameter of a portion of the outer surface 84 of the barrel 80 which the first sleeve 100 at least partially encircles. Thus, when the first sleeve 100 is pressed or shrink-fitted over the external diameter of the barrel 80, the first sleeve 100 may exert a radial compressive preload on the outer surface 84 of the barrel 80. The size of the first sleeve 100 (e.g., thickness, width, and inner diameter) may be properly chosen to meet the desired barrel expansion control while still being within a predetermined dimensional design envelope for the entire fuel injection pump assembly.

Furthermore, the thermal expansion coefficient of the first sleeve 100 may be selected to be smaller than that of the barrel 80. Thus, when the temperature of the fuel injection pump 20 is elevated due to high pressure fuel within the pumping chamber 86 and repeated pumping work, the radial expansion of the first sleeve 100 due to heat may be smaller than that of the barrel 80. When the first sleeve 100 expands less than the barrel 80, the first sleeve 100 may exert a compressive load on the outer surface 84 of the barrel 80. The thermal expansion control effect may be combined with the above mentioned mechanical control effect to provide improved controllability for the clearance 90.

Applying a plurality of sleeves, such as the first and second sleeves 100 and 100', may bring about more precise control of the clearance 90. The plurality of sleeves may be formed with the same material having the same Young's modulus and the same thermal expansion coefficient. In some embodiments, it is also possible that each sleeve may be formed with a Young's modulus and a thermal expansion coefficient different from those of the other sleeves. The dimensions, including the thickness, width, and inner diameter of the sleeves, may also vary among the sleeves. Parameters such as Young's modulus, thermal expansion coefficient, dimensions, and locations of the sleeves may be determined from analyses of the barrel geometry and the mechanical and thermal load distribution on the barrel 80. With a proper selection of parameters, the plurality of sleeves may help achieve substantially uniform clearance 90 in the longitudinal direction of the barrel 80.

Referring back to FIG. 2, further control of the radial expansion of the barrel 80 may be achieved through the cooling fluid 142 stored in the chamber 140. As illustrated in FIG. 2, the cooling fluid 142 may be in contact with an outer surface 102 of the first sleeve 100. Therefore, heat exchange may occur between the first sleeve 100 and the cooling fluid 142. The barrel 80 may be heated during the fuel pumping process, and first sleeve 100 may be heated through contact with the outer surface 84 of the barrel 80. By controlling the temperature of the cooling fluid 142, for example, through the controller 150 and the sensor 155, the temperature of the first sleeve 100 may be regulated. Regulating the temperature of the first sleeve 100 may subsequently reduce the thermal expansion of the first sleeve 100, and this may further reduce the mechanical and thermal expansion of the barrel 80. The clearance 90 thus may be maintained to be within a desired operating clearance range.

The disclosed fuel injection pump with one or more sleeves for radial expansion control may be employed in any fuel system that includes high pressure fuel injection. With one or more sleeves being applied to one or more portions of the outer surface of the barrel, the radial expansion of the barrel due to the high pressure and high temperature within the pumping chamber may be reduced. Further control of the radial expansion of the barrel may be achieved by controlling the temperature of the cooling fluid adjacent the outer surface of the sleeve. With the effects of the sleeves, the cooling fluid, or both, a substantially uniform clearance between the plunger and the barrel may be achieved and maintained. As a result, fuel leakage may be prevented or reduced, fuel pumping efficiency may be improved, and the service life of the fuel system may be prolonged.

It will be apparent to those skilled in the art that various modifications and variations can be made in the disclosed fuel injection pump. Other embodiments will be apparent to those skilled in the art from consideration of the specification and practice of the disclosed embodiments herein. It is intended that the specification and examples be considered as exemplary only, with a true scope of the disclosure being indicated by the following claims.

What is claimed is:

1. A fuel injection pump comprising:
   a barrel including an inner surface defining a bore;
   a plunger movable inside the bore of the barrel, wherein an outer surface of the plunger and the inner surface of the barrel form a clearance therebetween;
   first and second sleeves at least partially encircling and engaging first and second portions of an outer surface of the barrel, the first sleeve being adjacent an end of the bore proximate a fuel discharge valve, the second sleeve being spaced apart from the first sleeve and the end of the bore proximate the fuel discharge valve; and
   a chamber adjacent an outer surface of at least one or more sleeves and configured to contain a cooling fluid.

2. The fuel injection pump of claim 1, further including a controller configured to regulate a temperature of the cooling fluid and a sensor configured to measure the temperature of the cooling fluid.

3. The fuel injection pump of claim 2, wherein the sensor is configured to generate a signal indicative of the measured temperature, and the controller is coupled with the sensor and configured to receive the signal indicative of the measured temperature and regulate the temperature of the cooling fluid based on the measured temperature and a desired cooling effect.

4. A method of maintaining a clearance formed between an outer surface of a plunger and inner surface of a barrel of a fuel injection pump, the method comprising:
   pumping fuel from a reservoir to the fuel injection pump;
   applying a load to an outer surface of the barrel by one or more sleeves at least partially encircling one or more portions of the outer surface of the barrel; and
   controlling a temperature of a cooling fluid adjacent an outer surface of at least one of the one or more sleeves.

5. The method of claim 4, wherein the applying of the load is performed by first and second sleeves, the first sleeve and second sleeves being spaced apart.

6. The method of claim 4, wherein controlling the temperature of the cooling fluid includes measuring the temperature of the cooling fluid and regulating the temperature based on the measured temperature and a desired cooling effect.

7. A fuel system for an internal combustion engine, comprising:
   a fuel reservoir;
   a plurality of fuel injectors configured to inject fuel into at least one combustion chamber of the engine; and
   a fuel injection pump configured to pump fuel from the fuel reservoir to the plurality of fuel injectors, the fuel injector pump including:
   a barrel defining a bore therein;
   a plunger configured to reciprocate inside the bore of the barrel, wherein an outer surface of the plunger forms a clearance with an inner surface of the barrel;

first and second sleeves at least partially encircling and engaging first and second portions of an outer surface of the barrel, the first sleeve being spaced from the second sleeve and having at least one of a different Young's modulus or a different thermal expansion coefficient than the second sleeve; and a chamber adjacent an outer surface of at least one of the first and second sleeves and configured to contain a cooling fluid.

8. The fuel system of claim 7, further including a controller configured to regulate a temperature of the cooling fluid and a sensor configured to measure the temperature of the cooling fluid.

9. The fuel system of claim 8, wherein the sensor is configured to measure the temperature of the cooling fluid and generate a signal indicative of the measured temperature, and the controller is coupled with the sensor and is configured to receive the signal indicative of the measured temperature and regulate the temperature of the cooling fluid based on the measured temperature and a desired cooling effect.

10. The method of claim 4, wherein the first sleeve has at least one of a different Young's modulus or a different thermal expansion coefficient than the second sleeve.

* * * * *